United States Statutory Invention Registration [19]

[11] Reg. Number: H845

Braski et al. [43] Published: Nov. 6, 1990

[54] ADVANCED VANADIUM ALLOYS FOR MAGNETIC FUSION APPLICATIONS

[75] Inventors: David N. Braski; Philip J. Maziasz, both of Oak Ridge, Tenn.

[73] Assignee: The United States of America as represented by the United States Department of Energy, Washington, D.C.

[21] Appl. No.: 526,466

[22] Filed: May 16, 1990

[51] Int. Cl.[5] ..... C22C 27/02; C22C 32/00

[52] U.S. Cl. ..... 420/424; 428/614; 148/407; 148/422

*Primary Examiner*—Brooks H. Hunt
*Assistant Examiner*—Leon Nigohosian, Jr.
*Attorney, Agent, or Firm*—Katherine P. Lovingood; Stephen D. Hamel; William R. Moser

[57] ABSTRACT

Vanadium alloys and their fabrication to produce materials for fusion applications having small additions of Ti, C and Zr that improve resistance to helium embrittlement.

2 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ADVANCED VANADIUM ALLOYS FOR MAGNETIC FUSION APPLICATIONS

This invention relates to vanadium alloys for fusion applications and more particularly, to vanadium alloys having small amounts of Ti, C, and Zr added for improved performance in fusion applications and was developed pursuant to a contract with the U.S. Department of Energy.

BACKGROUND OF THE INVENTION

The selection of a suitable material for use as the first wall of a fusion reactor has been a continuing problem. One of the most serious problems associated with the first wall is radiation damage caused by the energetic neutrons emitted by the plasma. The neutrons cause irradiation hardening and also produce helium gas atoms within the matrix of a first wall material which collects on the grain boundaries of most structural alloys.

For this application, vanadium alloys have certain advantages compared with conventional structural materials such as stainless steels because they exhibit low residual activity after irradiation, high thermal conductivity and low thermal expansion. They also have good mechanical strength at high temperatures and good corrosion resistance when used with lithium, which has been proposed as a first wall coolant. However, these alloys are subject to radiation induced degradation of mechanical properties that comes from matrix hardening and from grain boundary embrittlement due to helium accumulation at the grain boundaries. Therefore, there is a continuing need to improve the resistance of vanadium alloys to these radiation-induced phenomena.

SUMMARY OF THE INVENTION

In view of the above needs, it is an object of this invention to provide an alloy for fusion applications that resists helium embrittlement.

It is another object of this invention to provide an alloy for fusion applications that resists radiation hardening.

An additional object of this invention is to provide a vanadium alloy which when subjected to suitable thermomechanical treatment processes, forms a dispersion of MC type carbide particles that improves the performance of the alloy for fusion applications.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the composition of this invention may consist essentially of vanadium and a sufficient amount of Ti and C to cause formation of a large number of small MC-type particles uniformly throughout the material. In the preferred embodiment the alloy comprises from 93.5 to 99.45 wt % V, from 0.5 to 6 wt % Ti and from 0.05 to 0.5 wt % C. In addition the invention consists essentially of vanadium and a sufficient amount of Ti, C and Zr to cause formation of two MC-type precipitates with different compositions, each to be distributed uniformly throughout the material. In the preferred embodiment the alloy comprises from 93 to 99.35 wt % V, from 0.5 to 6 wt % Ti, from 0.05 to 0.5 wt % C and from 0.1 to 0.5 wt % Zr. When these alloys are subjected to proper thermomechanical treatment, small, thin disks of MC are formed, providing improved properties that make them useful in fusion environments.

DETAILED DESCRIPTION OF THE PREFERRED EMBODIMENT

The invention is comprised of vanadium alloys having dispersions of tiny face-centered-cubic (fcc) carbide particles. Alloys having only V, Ti and C contains a single MC-type carbide particle, whereas the alloys having Zr added contain two MC-type carbides with two separate and distinctly different compositions. The compositions of the alloys are in the Table.

TABLE

| | Composition, wt % | | | |
|---|---|---|---|---|
| Alloy No. | V | Ti | Zr | C |
| V1 | 98.45 | 1.5 | | 0.05 |
| V2 | 98.40 | 1.5 | | 0.10 |
| V3 | 98.25 | 1.5 | | 0.25 |
| V4 | 96.90 | 3.0 | | 0.10 |
| V7 | 98.30 | 1.5 | 0.15 | 0.05 |
| V8 | 98.25 | 1.5 | 0.15 | 0.10 |
| V10 | 96.75 | 3.0 | 0.15 | 0.10 |
| V11 | 98.10 | 1.5 | 0.30 | 0.10 |

Ingots weighting 400 g were arc-cast under argon into water-cooled copper molds. The cast microstructure for each alloy had elongated particles of carbide. The size, from 1 to 6 $\mu$m long, and number of the particles generally increase with the carbon content. Analytical transmission electron microscopy (TEM) revealed that many more, even smaller carbides, less than 0.2 $\mu$m, exist in the as cast microstructure. The V-Ti-C alloys contain small, thin disks of MC where M is about 25 wt % V and 75 wt % Ti. The V-Ti-Zr-C alloys also contain MC but M is composed of approximately 13.5 wt % V, 70.9 wt % Ti and 15.6 wt % Zr. A second, small (200 nm) MC-type carbide was observed in these alloys which tended to be blocky or geometric shaped. These particles are Zr rich with M equal to about 1.6 wt % V, 18.3 wt % Ti and 80.1 wt % Zr.

The composition and process described in the following example is intended to be illustrative and not in any way a limitation on the scope of the invention. Persons of ordinary skill in the art should be able to envision variations on the general principle of this invention that fall within the scope of the generic claims the follow.

EXAMPLE

The cast ingots were solution annealed at 1200° C. for 1 hour in a vacuum furnace ($p<10^{-4}$)Pa) to dissolve most of the MC particles. The ingots were warm rolled at 500° C. from a starting thickness of 1.27 cm down to 0.76 mm with intermediate 30 minute anneals at 1000° C. after reaching a thickness of 0.57 and 0.13 cm. Prior to the intermediate anneals and after the final rolling passes, the vanadium alloy sheets were pickled in solution consisting of 6 parts $H_2O$, 3 parts $HNO_3$, and 1 part HF by volume. The sheets were wrapped in Cb-1Zr foil to serve as a getter for the intermediate anneals which were conducted in a vacuum furnace ($p<10^{-3}$Pa). The rolling of the alloys having lower carbon content was done with relative ease as evidenced by the smooth surfaces and edges of the final fabricated sheets. However as more carbon is added, the alloy became stronger and more difficult to roll. When the alloy is strengthened too much the sheets can crack during the rolling process unless the fabrication parameters are properly adjusted.

Miniature tensile specimens were machined from the 0.76 mm sheet. Disks 3 mm in diameter for TEM were punched from the sheet and ground down to about 0.3 mm. Tensile specimens and TEM disks from all of the alloys were solution annealed at 1250° C. for 1 hour. These are referred to as "SA" specimens. Some of the SA specimens of both types were subsequently aged in quartz capsules under ½ atm of argon at 800° C. for two weeks; this condition was called "SA+A", or solution annealed and aged. Finally a third group of as-rolled or 50% warm-worked specimens were also thermally aged using similar parameters to create the "WW+A", or warm-worked at 500° C. and aged condition. The microstructure for the V-Ti-C and V-Ti-Zr-C, alloys VI and V11, produced by the heat treatments were similar. That is, the SA condition leaves the microstructure with only a few, but sometimes large precipitates. Aging at 800° C. (SA+A) precipitates thin disks of the Ti-rich MC-type carbides. The disks are parallel to the (100) planes in the crystal and, therefore, have three variants or orientations within each grain. The WW+A treatment creates a cell structure with many subgrain boundaries and dislocation segments. The carbide particles produced by this latter treatment range from 100 to 200 nm in size and have an equiaxed morphology instead of the oriented thin disks found in the SA+A condition. The heat treatment is important since the carbide-toughened alloys can be easily fabricated in the "soft" condition and subsequently heat treated to precipitate out the carbides and generate the desired tensile properties.

The tensile properties for the eight advanced alloys are listed in Table 2.

TABLE 2

| | | | Tensile properties | | | | |
|---|---|---|---|---|---|---|---|
| | | | Test | | | | |
| | Specimen | | Temperature | Stress, MPa | | Elongation, % | |
| Alloy | No. | Condition | (°C.) | Yield | Ultimate | Uniform | Total |
| V1 | V107 | SA[a] | 420 | 266 | 438 | 11.2 | 17.0 |
| V1 | V108 | SA | 520 | 255 | 515 | 18.1 | 22.8 |
| V1 | V104 | SA | 600 | 256 | 524 | 16.6 | 22.3 |
| V1 | V111 | SA + A[b] | 420 | 313 | 424 | 8.0 | 13.3 |
| V1 | V113 | SA + A | 520 | 327 | 438 | 7.3 | 14.7 |
| V1 | V121 | SA + A | 600 | 312 | 429 | 8.7 | 16.7 |
| V1 | V103 | WW + A[c] | 420 | 353 | 412 | 5.7 | 13.3 |
| V1 | V106 | WW + A | 520 | 356 | 424 | 6.3 | 14.7 |
| V1 | V118 | WW + A | 600 | 366 | 429 | 5.3 | 13.0 |
| V2 | V202 | SA | 420 | 242 | 521 | 14.8 | 20.6 |
| V2 | V215 | SA | 520 | 240 | 442 | 10.8 | 15.6 |
| V2 | V217 | SA | 600 | 251 | 582 | 18.3 | 22.6 |
| V2 | V219 | SA + A | 420 | 325 | 475 | 8.3 | 15.0 |
| V2 | V223 | SA + A | 520 | 346 | 492 | 8.7 | 16.0 |
| V2 | V224 | SA + A | 600 | 331 | 463 | 8.7 | 16.7 |
| V2 | V204 | WW + A | 420 | 369 | 415 | 6.0 | 14.0 |
| V2 | V212 | WW + A | 520 | 369 | 440 | 6.7 | 16.7 |
| V2 | V221 | WW + A | 600 | 383 | 457 | 6.7 | 14.3 |
| V3 | V309 | SA | 420 | 237 | 424 | 10.8 | 16.2 |
| V3 | V317 | SA | 520 | 237 | 538 | 14.8 | 21.0 |
| V3 | V313 | SA | 600 | 237 | 570 | 20.0 | 30.5 |
| V3 | V307 | SA + A | 420 | 293 | 482 | 9.0 | 14.3 |
| V3 | V304 | SA + A | 520 | 336 | 589 | 11.7 | 16.3 |
| V3 | V315 | SA + A | 600 | 308 | 578 | 12.3 | 25.0 |
| V3 | V302 | WW + A | 420 | 461 | 586 | 9.7 | 13.3 |
| V3 | V305 | WW + A | 520 | 475 | 593 | 9.7 | 13.0 |
| V3 | V321 | WW + A | 600 | 458 | 593 | 8.7 | 21.7 |
| V4 | V410 | SA | 420 | 324 | 404 | 13.8 | 22.3 |
| V4 | V418 | SA | 520 | 284 | 551 | 19.6 | 27.0 |
| V4 | V420 | SA | 600 | 281 | 571 | 20.3 | 28.0 |
| V4 | V402 | SA + A | 420 | 219 | 376 | 11.0 | 18.7 |
| V4 | V411 | SA + A | 520 | 221 | 391 | 11.6 | 19.5 |
| V4 | V421 | SA + A | 600 | 224 | 388 | 14.2 | 19.0 |
| V4 | V405 | WW + A | 420 | 293 | 376 | 8.3 | 15.9 |
| V4 | V407 | WW + A | 520 | 280 | 372 | 9.1 | 16.8 |
| V4 | V412 | WW + A | 600 | 296 | 393 | 7.5 | 13.8 |
| V7 | V713 | SA | 420 | 246 | 414 | 12.2 | 20.5 |
| V7 | V714 | SA | 520 | 240 | 520 | 15.9 | 22.0 |
| V7 | V721 | SA | 600 | 244 | 567 | 15.8 | 21.6 |
| V7 | V703 | SA + A | 420 | 250 | 394 | 10.3 | 19.0 |
| V7 | V704 | SA + A | 520 | 263 | 416 | 10.3 | 18.0 |
| V7 | V706 | SA + A | 600 | 253 | 406 | 11.0 | 16.7 |
| V7 | V702 | WW + A | 420 | 335 | 394 | 6.7 | 15.0 |
| V7 | V705 | WW + A | 520 | 339 | 409 | 7.0 | 14.0 |
| V7 | V722 | WW + A | 600 | 342 | 407 | 7.3 | 12.7 |
| V8 | V801 | SA | 420 | 226 | 494 | 13.8 | 18.8 |
| V8 | V804 | SA | 520 | 207 | 518 | 15.5 | 20.9 |
| V8 | V817 | SA | 600 | 228 | 569 | 20.6 | 27.6 |
| V8 | V802 | SA + A | 420 | 220 | 402 | 10.0 | 16.0 |
| V8 | V809 | SA + A | 520 | 240 | 420 | 10.3 | 17.3 |
| V8 | V818 | SA + A | 600 | 234 | 431 | 12.7 | 21.7 |
| V8 | V811 | WW + A | 420 | 349 | 419 | 7.0 | 14.3 |

TABLE 2-continued

| Alloy | Specimen No. | Condition | Tensile properties: Test Temperature (°C.) | Stress, MPa: Yield | Stress, MPa: Ultimate | Elongation, %: Uniform | Elongation, %: Total |
|---|---|---|---|---|---|---|---|
| V8 | V820 | WW + A | 520 | 362 | 432 | 6.7 | 12.3 |
| V8 | V821 | WW + A | 600 | 374 | 446 | 7.0 | 15.0 |
| V10 | V1001 | SA | 420 | 245 | 432 | 13.2 | 22.4 |
| V10 | V1019 | SA | 520 | 246 | 533 | 15.5 | 23.0 |
| V10 | V1015 | SA | 600 | 237 | 511 | 16.2 | 25.4 |
| V10 | V1003 | SA + A | 420 | 199 | 344 | 11.7 | 21.0 |
| V10 | V1007 | SA + A | 520 | 188 | 350 | 12.3 | 20.0 |
| V10 | V1008 | SA + A | 600 | 201 | 357 | 11.3 | 19.7 |
| V10 | V1010 | WW + A | 420 | 296 | 381 | 8.0 | 15.7 |
| V10 | V1011 | WW + A | 520 | 293 | 372 | 8.7 | 16.0 |
| V10 | V1013 | WW + A | 600 | 305 | 376 | 7.3 | 13.7 |
| V11 | V1123 | SA | 420 | 244 | 433 | 14.0 | 22.5 |
| V11 | V1105 | SA | 520 | 254 | 558 | 15.0 | 20.6 |
| V11 | V1119 | SA | 600 | 247 | 568 | 19.4 | 26.2 |
| V11 | V1110 | SA + A | 420 | 317 | 456 | 8.9 | 17.0 |
| V11 | V1122 | SA + A | 520 | 324 | 466 | 8.0 | 16.0 |
| V11 | V1124 | SA + A | 600 | 319 | 472 | 9.3 | 17.7 |
| V11 | V1104 | WW + A | 420 | 388 | 456 | 5.7 | 11.3 |
| V11 | V1108 | WW + A | 520 | 408 | 483 | 5.7 | 11.7 |
| V11 | V1113 | WW + A | 600 | 403 | 469 | 5.7 | 12.0 |

[a]SA = solution annealed 1 h at 1250° C.
[b]SA + A = solution annealed 1 h at 1250° C. and aged two weeks at 800° C.
[c]WW + A = 50% warm worked and aged two weeks at 800° C.

Looking at the results for VI, the SA+A treatment produces a stronger alloy, having higher yield strength, with less ductility, total elongation, than the SA treatment. The WW+A has even higher yield strengths with slightly lower ductility compared to the SA+A. These results would be expected from the microstructures of the respective alloys. The results are generally the same for the other alloys with minor differences depending on the amount of carbon and whether Zr is added or not.

Additional carbon, above the lowest level of 0.05 wt %, did not always make the alloys stronger because the carbide particles were coarsened and their numbers reduced. Thus, precipitation hardening effects were minimized. In some cases, the addition of Zr provided additional increases in ultimate strength with little or no loss in ductility as shown by V7-SA compared with V1-SA. In other cases the alloys with the Zr additions were slightly weaker and more ductile as seen by comparing V8 and V2.

Increasing the amount of Ti from 1.5 to 3.0 wt % increased the strength and ductility of V2 to that of V4, but the gain in strength was lost upon aging. This is because the solid solution strengthening offered by the Ti in the SA condition was lost when the Ti precipitated out in the Ti-rich MC particles. What resulted was a weaker matrix with MC particles that were too coarse to add substantial precipitation-hardening.

The specimens were also tested for resistance to helium embrittlement. All four V-Ti-C alloys increased their ductility at 420° C. with addition of helium and exhibited only modest losses as test temperatures increased. The V-Ti-Zr-C alloys showed similar behavior with the exception of V7 and V10 which had slight losses at 420° C. rather than increases. This represents a dramatic improvement in resistance to helium embrittlement relative to other vanadium alloys. The reason for the improved resistance to helium embrittlement demonstrated by the advanced V-Ti-C and V-Ti-Zr-C alloys is that thin Ti-rich MC disks in the alloys act as sinks for the helium in the microstructure. This prevents the helium from migrating to the grain boundaries, which causes embrittlement. In addition, Ti-rich MC particles in the grain boundaries themselves directly trap helium that flows to the grain boundaries. These trapping mechanisms enable the alloys to accommodate more helium before serious helium embrittlement occurs. The WW+A condition also is effective in resisting helium embrittlement, but for different reasons. With the warm-worked microstructure, helium is trapped on dislocations, at subgrain boundaries, and at equiaxed MC particles. Furthermore there appear to be no high angle grain boundaries in the WW+A material where helium collects to form the largest bubbles in the microstructure.

We claim:

1. A composition of matter consisting essentially of vanadium and a sufficient amount of Ti and C to produce MC-type carbides in the matrix and grain boundaries that trap helium, thereby reducing helium embrittlement.

2. A composition of matter consisting essentially of vanadium and a sufficient amount of Ti, C and Zr to produce two MC-type carbides throughout the alloy microstructure that trap helium, thereby reducing helium embrittlement.

* * * * *